United States Patent
Joshi et al.

(10) Patent No.: US 7,502,317 B2
(45) Date of Patent: Mar. 10, 2009

(54) METHOD FOR DIFFERENTIATING SERVICES AND USERS IN COMMUNICATION NETWORKS

(75) Inventors: Niranjan S. Joshi, Morris, NJ (US);
Srinivas R. Kadaba, Morris, NJ (US);
Gopal N. Kumar, Morristown, NJ (US);
Ganapathy S. Sundaram, Middlesex, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1014 days.

(21) Appl. No.: 10/146,921

(22) Filed: May 17, 2002

(65) Prior Publication Data
US 2003/0214951 A1 Nov. 20, 2003

(51) Int. Cl.
*H04L 12/28* (2006.01)

(52) U.S. Cl. .................. 370/230; 370/235; 370/252; 370/395.42; 370/412

(58) Field of Classification Search ............... 370/310, 370/322, 329, 341, 348, 349, 412, 413, 415, 370/417, 429, 395.4, 395.41, 395.42, 395.43
See application file for complete search history.

(56) References Cited

U.S. PATENT DOCUMENTS

| | | | | |
|---|---|---|---|---|
| 5,268,900 A | * | 12/1993 | Hluchyj et al. | 370/429 |
| 6,393,012 B1 | * | 5/2002 | Pankaj | 370/342 |
| 6,477,373 B1 | * | 11/2002 | Rappaport et al. | 455/436 |
| 6,680,907 B1 | * | 1/2004 | Bonaventure | 370/229 |
| 6,807,426 B2 | * | 10/2004 | Pankaj | 455/453 |
| 7,050,567 B1 | * | 5/2006 | Jensen | 379/266.01 |

\* cited by examiner

*Primary Examiner*—Chi H. Pham
*Assistant Examiner*—Shick Hom

(57) ABSTRACT

Disclosed is a method for queuing in a communications network. The method positions data related to a user based on a grade of service (GoS) assigned to the user. The positioning of the data is accomplished according to a throughput range assigned to the user.

11 Claims, 3 Drawing Sheets

METHOD FOR DIFFERENTIATING SERVICES AND USERS IN COMMUNICATION NETWORKS

BACKGROUND OF THE INVENTION

1. Field of the Invention

The present invention generally relates to wireless communication networks. In particular, the present invention relates to wireless packet data networks.

2. Background

Wireless communications that involve transmitting Internet based data over cellular networks have become more popular. As a result, the efficient scheduling of data transmission to multiple cellular mobile stations has become critical. Several techniques have been used to schedule data transmissions to cellular mobile stations. In a round robin technique, data is transmitted to each mobile station that has data in a queue until each mobile station has received a transmission. After all of the mobile stations have received a data transmission, this process is repeated. In another technique, data is transmitted to the mobile station based on the size of the backlog of data in a queue. In still another known technique, data is transmitted to the mobile station based on the data arrival instants for the mobile station.

Although the techniques discussed above are useful in providing efficient scheduling of data transmission to cellular mobile stations, there remains a need to provide the same type of Grade of Service (GoS) in wireless communication networks as is enjoyed in conventional pricing of wire line data access. Furthermore, the need to maintain proper Quality of Service (QoS) in voice and data transmission systems is of significant importance.

In wire line networks, pricing levels depend on bandwidth. For example, DSL subscribers pay more than dial-up Internet subscribers to get a higher GoS, QoS or bandwidth. Therefore, in the wire line model it is simple to proper service to users since users are easily differentiated by way of their connection type to the Internet.

The differentiated service model is equally applicable to wireless data networks. For example, it would be advantageous to create three classes of users "A", "B", and "C", such that the "A" users are offered higher throughputs than "B" users, who in turn are offered higher throughputs than "C" users. In this example, each GoS class could be characterized by a "guaranteed" minimum throughput and a maximum "allowable" throughput. To upgrade one would need to pay more and then would be able to enjoy a higher minimum rate and a higher maximum rate. In order to offer these grades of service, guarantees are essential and these promises need to be kept. The lower limit is a promise to the customer, and the higher limit is crucial for making business sense. This example is akin to the pricing based on comfort that exists in airline travel: first class travelers pay more than business class travelers, and business class travelers pay more than economy class travelers.

An alternative scenario is one in which a GoS is characterized by a target throughput. The need for target throughputs arises in situations where there is a certain amount of data to be transmitted every so often without the possibility of much buffering. This is a common occurrence with delay and/or jitter sensitive services such as Voice over Internet Protocol (VoIP) and streaming audio and video. Consequently, provisioning a higher throughput is a waste of resources when there is little or no data to transmit. On the other hand, lower throughput could result in loss of data and reduced service quality. This motivates the need for methods to offer a target throughput.

Unlike dial-up and DSL, the wireless channel is a shared medium, and varies with time. Furthermore, data rates are widely disparate depending on a user's position in the cell. This problem is more acute in Code Division Multiple Access (CDMA) than in Time Division Multiple Access (TDMA) due to its interference-limited nature. Therefore, provisioning of GoS in wireless networks is an interesting technical challenge.

SUMMARY OF THE INVENTION

An embodiment of the present invention includes a method for positioning user data, in a network queue, based on GoS assigned to the user. In particular, a throughput of the user is determined and compared with a throughput range assigned to the user in accordance with GoS. If the throughput of the user is lower than the assigned range, then the user's place within a data queue is modified accordingly. That is, the data associated with the user will likely move-up in the queue with respect to other data therein. However, if the throughput of the user is higher than the assigned range, then the data associated with the user may move down in the queue with respect to other data therein.

A method according to the present invention may be embodied in hardware and/or software alike. Preferably, the method may be implemented in a base station; however, other operational elements of a communications network may also implement the method.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFFERED EMBODIMENTS

The present invention provides a method that a service provider can use to offer GoS over a CDMA wireless network. However, this method is equally applicable to other air interfaces such as TDMA.

Figure 1:
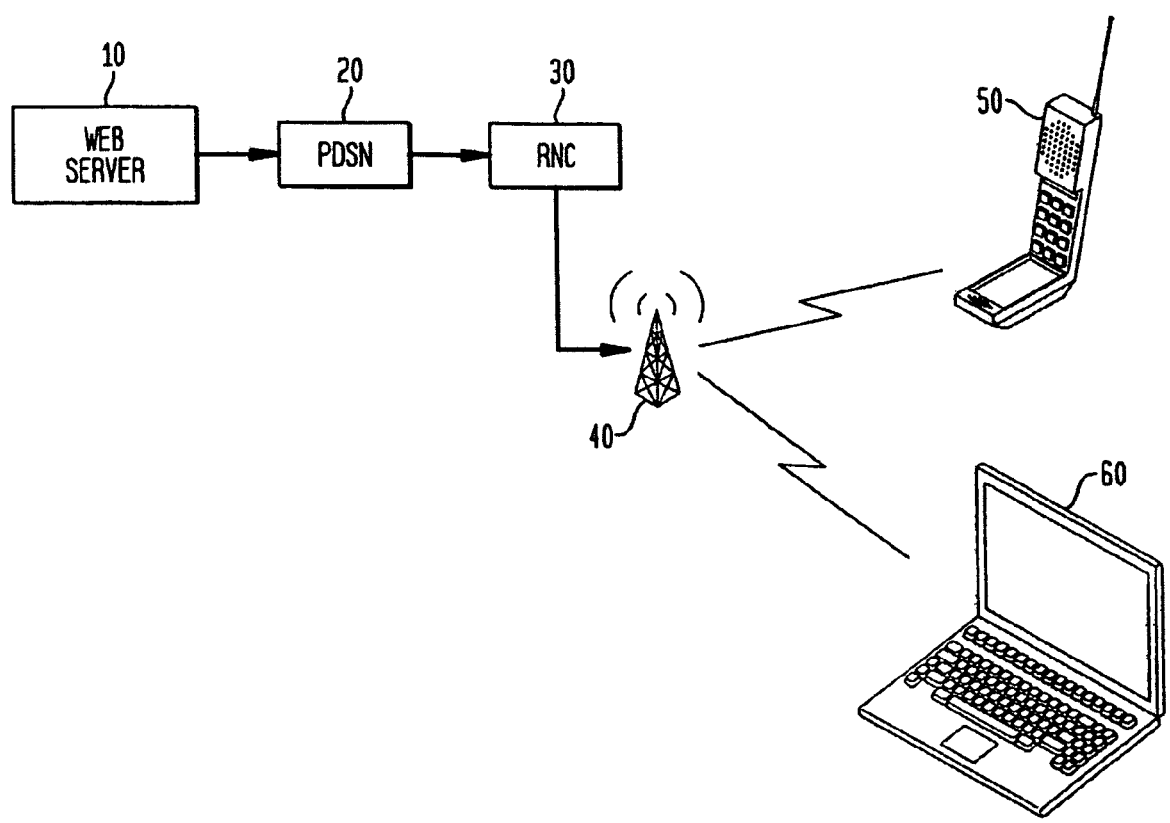
FIG. 1 illustrates a conventional network structure of a CDMA wireless network.

FIG. 1 illustrates a conventional network structure of a wireless network. When a user of a mobile station (MS) 50 or 60 establishes a communication session in the wireless network, a link is setup between a packet data servicing node (PDSN) 20 and the MS 50. The PDSN 20 is a router, which functions as a gateway for data flow to and from all the MSs in the entire network. A radio network controller (RNC) 30 is provided that interfaces with the PDSN 20 and a base station (BS) 40. The RNC 30 is the point at which the wireless link layer protocols (such as the radio link protocol) terminate. The air interface terminates at the BS 40.

As is illustrated in FIG. 1, multiple MSs (50 and 60) may communicate with the BS 40. It is also possible that multiple RNCs 30 may be in communication with the PDSN 20. The PDSN 20 may belong to the Internet service provider (ISP)

where a web server 10 may be located, or the PDSN 20 may also belong to the wireless service provider (WSP). Typically, the RNC 30 and BS 40 almost always belong to the WSP. Also illustrated in FIG. 1 is a web server 10 that interfaces with the PDSN 20 The GoS provisioning according to the present invention may be performed by any of the elements illustrated in FIG. 1.

However, there are pros and cons of GoS provisioning at each of elements illustrated in FIG. 1. Given the hierarchical architecture, the number of MSs 50 and 60 which have a logical connection with the PDSN 20 (or a RNC 30) is significantly larger than those in communication with the BS 40. Hence, GoS provisioning at either the PDSN 20 or the RNC 30, on a per-user basis, can impose prohibitive computing costs.

This makes it more attractive to provide GoS via air interface resource management at the BS 40. However, the server 10, which maintains service level agreements, should now convey this information to the BS 40. Since communication between server 10 and the BS 40 is wasteful, this information can be percolated down to the BS 40 via the RNC 30. The cost of such percolation may be mitigated by piggybacking the GoS information over protocols that exist between the RNC 30 and the BS 40.

As discussed briefly in the Background hereof, wireless communication networks currently employ scheduling algorithms that attempt to efficiently manage network resources. These algorithms will now be discussed in more detail.

It is useful to begin with an intuitive definition of fairness: equal resources to all users. However, in CDMA downlinks, resources include time, power, and bandwidth (i.e. Walsh codes). In order to simplify the problem, all the power and bandwidth can be provided to one user at a time. This leads to the definition that a fair algorithm is one that gives equal time to all users. An algorithm, which indeed provides such fairness, is the so-called Round Robin (RR) scheme, where in the downlink channel is offered to one user for a fixed amount of time and we cycle through users in a fixed sequence. The drawback of this algorithm is that the efficiency of the network is completely ignored. In particular, the individual channel conditions of the users (due to their location as well as fading) are disregarded. On the other hand, the network may have a feedback channel from the MS 50 and/or 60 to the BS 40 in which the instantaneous channel conditions are reported. Based on the feedback received, the network can then assign resources to the user with the best channel conditions. Arguably, this is the best algorithm from a network efficiency point of view; the algorithm is referred to as Highest Rate User First (HRUF). But, the drawbacks of this algorithm include the overhead incurred due to the near-constant feedback and the total lack of fairness due to the fact that MSs 50 and 60 in bad channel conditions are "starved" in order to improve the network efficiency. Since network efficiency is in fact a very important consideration, the channel feedback overhead is now widely accepted.

Given this scenario of trying to strike a balance between network efficiency and user fairness, the problem is to find an algorithm that provides roughly equal time to all users, and maximizes network throughput subject to this constraint. One such algorithm is the Proportional Fair (PF) algorithm. The algorithm works by allotting resources at any given instant to the user who has the highest priority. The priorities are computed as follows: for every user the algorithm determines a throughput index at any given instant which is the ratio of the throughput that the user has received over a finite window in the past and the rate corresponding to the instantaneous channel conditions, following which the user with the least throughput index is declared as the highest priority. This algorithm is better than RR both in terms of network efficiency and user throughput, since it allots the resources to any given user if and when the user has "good channel conditions" and is fair by providing roughly equal time to all users.

The PF algorithm described above does not take into account any extra intelligence that can be extracted from queue dynamics. This intelligence may be quantified in terms of arrival times and queue sizes. An algorithm, which strikes a balance between, network efficiency, user fairness, and exploits the intelligence that can be derived from the queue dynamics (both arrival times and queue sizes), is called RMAX. The algorithm works as follows: for every user, create a deadline based on the arrival time, queue size and the state of the channel (along with a normalized delay term which applies to all users at a given instant, called system stretch, which is updated over time). Next, sort the deadlines, and allot resources to the user who has the earliest deadline. This algorithm can also be regarded as a priority based scheduling algorithm, where in the user with the earliest deadline has the highest priority. In this algorithm, the normalized delay of a user is the ratio of the actual response time to deliver a page (or request) to the minimum time needed to deliver the same page, if that user was dedicated all the resources from the time of arrival.

Downlink scheduling schemes that exploit knowledge of page sizes (for example, the size of web pages requested by a user, which is queued up at the scheduler) provide performance advantages over those that do not. However, a scheduler can exploit such information only if it is available. Traditionally, on wired IP networks, such information has not been made available at the scheduling routers. The very utility of such information is questionable since IP routing provides multiple paths between the sender and receiver; different segments of a web page can travel over different paths, thus making it difficult to utilize size information at the routers. On the other hand, in a cellular wireless network, the BS 40 functions as the gateway for all information flow to and from a MS 50 and/or 60 within its coverage. Therefore, on the downlink, the BS 40 may be modeled as a proxy server as opposed to a general-purpose router. Accordingly, a scenario in which the availability of size information is within the realm of possibility and the problem is one of extracting it.

This is possible due to recent techniques that attempt to improve TCP performance over wireless links. Succinctly put, these techniques attempt to improve performance by isolating the wired and wireless hops of the end-to-end link. The isolation may be achieved by physically separating the hops or by logical separation via interception of the data flow, or by the use of performance-enhancing proxies or custom protocols over the wireless link. Alternatively, if the PDSN 20 communicates with an application server, such size information is directly and accurately available, and the issue is now one of percolating it to the scheduler. The essential feature of all these approaches is the use of store-and-forward mechanisms, thus providing size information to varying degrees of accuracy. Therefore, many approaches to wireless packet data involve mechanisms that can provide access to page size information.

The Present Invention Applied to Scheduling Functions

The two GoS scenarios according to the present invention are summarized as follows:

1. Ensure that the throughput of the $i^{th}$ user is between a pre-defined minimum and maximum. In other words guarantee that the users are in throughput intervals that are appropriate to their individual class of service. This is called the min-max constraint problem. The range is denoted by $[R^i_{min}, R^i_{max}]$.

2. Ensure that the throughput of the $i^{th}$ user meets a pre-defined target. This is typically applicable to certain types of service classes rather than user classes. We call this as the target constraint problem, and denote the target as $R^i_{target}$.
   a) For simplicity, the user index on the throughput intervals and targets are omitted.
   b) The target constraint problem is easily translated into a min-max constraint problem by choosing $R_{min}$ slightly less than $R_{target}$, and $R_{max}$ slightly more than $R_{target}$. Henceforth, we focus on the min-max constraint problem.
   c) If there is no minimum throughput constraint, then $R_{min}$ is set to 0.
   d) If there is no maximum rate constraint, then $R_{max}$ is set to the highest rate in the permitted set of data rates in the system.

The scheduling algorithms considered so far do not have the machinery to be able to guarantee that users have throughputs within an interval which signifies their GoS. The present invention solves this problem is by enhancing the PF and RMAX scheduling algorithms by employing a "constraint function" Wi(t) while calculating the priority for the $i^{th}$ user. More generally, the constraint function can be applied to a wide range of scheduling algorithms. Nevertheless, the focus herein is on PF and RMAX since they inherently strike a good balance between network efficiency and user fairness.

An objective of the constraint function of the present invention is to maintain user throughput in the range $[R_{min}, R_{max}]$. This can be achieved by (i) assigning penalties to users with throughputs exceeding $R_{min}$ (ii) assigning an urgency (urgency is a negative penalty) to users with throughputs falling short of $R_{min}$. The penalty or urgency is a function of how far the user's throughput is from $R_{min}$.

A functional form of the constraint is described below. For the $i^{th}$ user, let $r_i(t)$ be the throughput over a time window of interest. Let $b_i$ be a constant greater than 1, which is a function of the GoS class. The greater the $b_i$, the lower the GoS class. Also, let k be an odd positive integer. The constraint function $W_i(t)$ is given by:

$$W_i(t) = (b_i)^{\omega_i(t)}$$

where $$\omega_i(t) = \left(\frac{r_i(t) - R_{min}}{R_{max} - R_{min}}\right)^k.$$

The role of $\omega_i(t)$ is to apply appropriate penalties depending on the throughput $r_i(t)$ of the $i^{th}$ user relative to the allowed rate interval $[R_{min}, R_{max}]$. Next, it is important to note that in order to provide urgency or negative penalties to users below the minimum rate, k should be an odd integer. The exponent k is important to the degree of control that is desired to exert over the variation of user throughputs. The parameter $b_i$ plays the role of mapping the penalties into appropriate constraint values for the priority.

A central assumption in the formulation of the constraint function according to the present invention is that the user throughput $r_i(t)$ is available. The choice of the time window over which $r_i(t)$ is calculated has to be made carefully, particularly with bursty traffic. A time window that makes most sense from the point of view of the nature of traffic is called the perception window. The perception window could be varied across users, but fixed for a given user.

More generally, any odd, monotonically increasing function can serve as a penalty function (an odd decreasing function can serve as an urgency function). Further, it is not required to use a continuous function. Families of substitutes can be piecewise continuous, non-explicit representations—a look up table or any other representation may be formed that satisfies the following properties (using penalty interpretation): 1) Negative when the argument is negative and 2) Monotonically increasing everywhere.

The constraint function polices the scheduling procedure, thereby making sure that all users are within the desired interval for each grade or class of service. How closely huddled the users are within this interval is decided by the values of bi and k. In other words, the variance of user throughput is decided by these two parameters. The structure of the constraint function does not assume any specific form of the underlying scheduler.

The constraint function of the present invention is applied to the PF and RMAX algorithms as follows:

1. In the PF algorithm, the throughput index or priority of the $i^{th}$ user is $(T_i(t)/CR_i(t))W_i(t)$, where $T_i(t)$ is the throughput measured over a finite window in the past, and $CR_i(t)$ is the rate corresponding to the channel conditions at time t. Once again the higher the throughput index, the lower the priority, and the user is scheduled with the highest priority.

2. In the RMAX algorithm, the deadline or priority of the $i^{th}$ user is equal to $S(t)(|j_i|/CR_i(t))W_i(t)+a_i$, where S(t) is the system stretch value at time t, $J_i$ is the page size of the page in the queue for that user, $CR_i(t)$ is the rate corresponding to the channel conditions at time t, and $a_i$ is the arrival time of the page.

The constrained versions of PF and RMAX will are referred to as C-PF and C-RMAX respectively.

It has been observed that in reality, the traffic can be dominated by many small pages, which require typically very little time to complete. This can result in very high individual page throughputs. When attempting to provide GoS, this results in a seeming lack of control thereby weakening the scheduling procedure. One way to combat this is to create a "deliberate wait time" before considering the user for priority computation. This wait time is termed consideration time, and will allow the scheduling algorithm to adaptively choose when to start considering a user. This can also be interpreted as the time when a user enters the queue. In other words, this method alters the arrival time to a later point in order to guarantee that the user's throughput is bounded between the specified minimum and maximum values. Further, the parameter bi can be adaptively chosen to reflect the time-varying control that is required when very different traffic patterns are observed.

Figure 2:
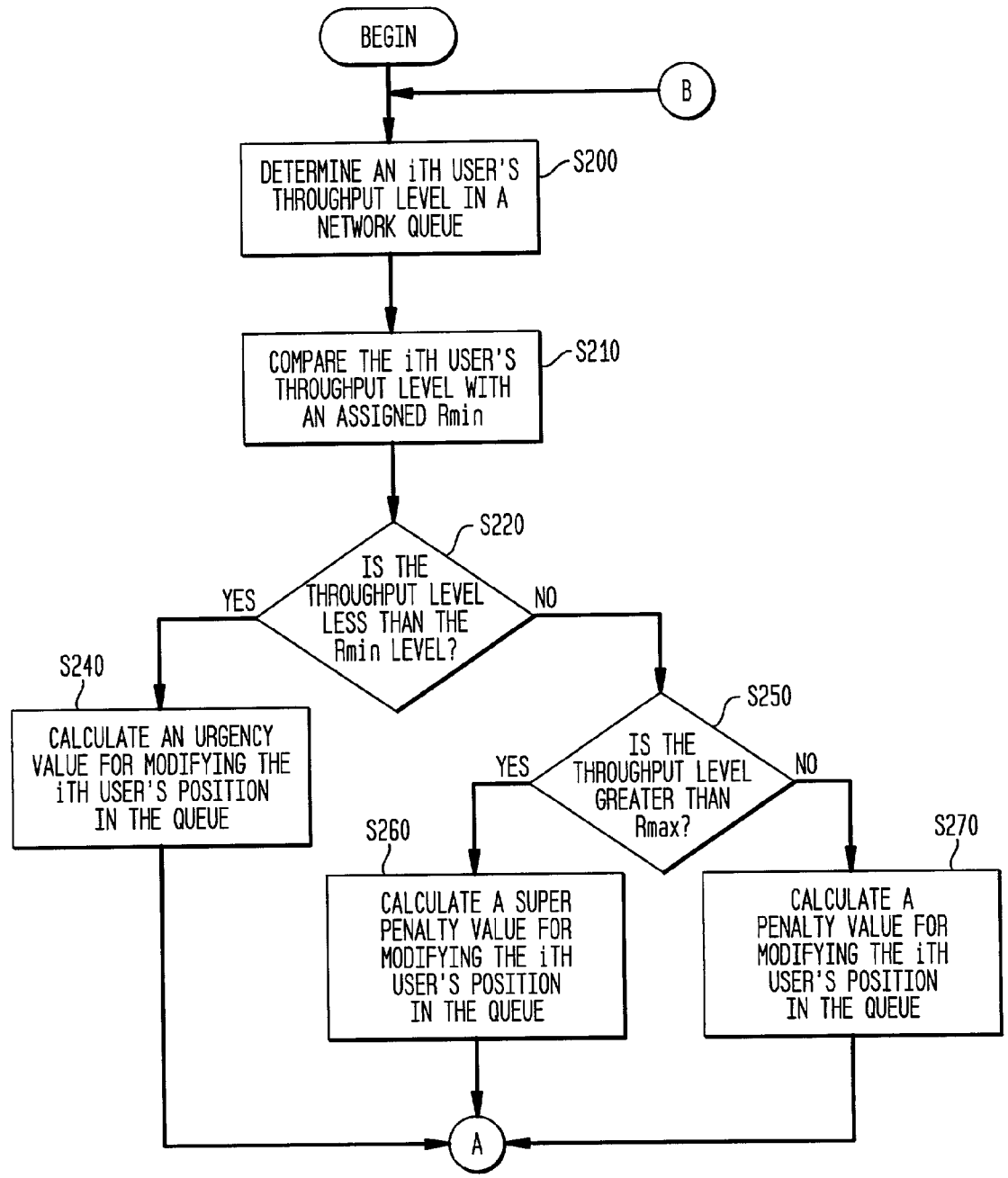
FIG. 2 illustrates a flowchart representative of a method according to the present invention.
Figure 3:
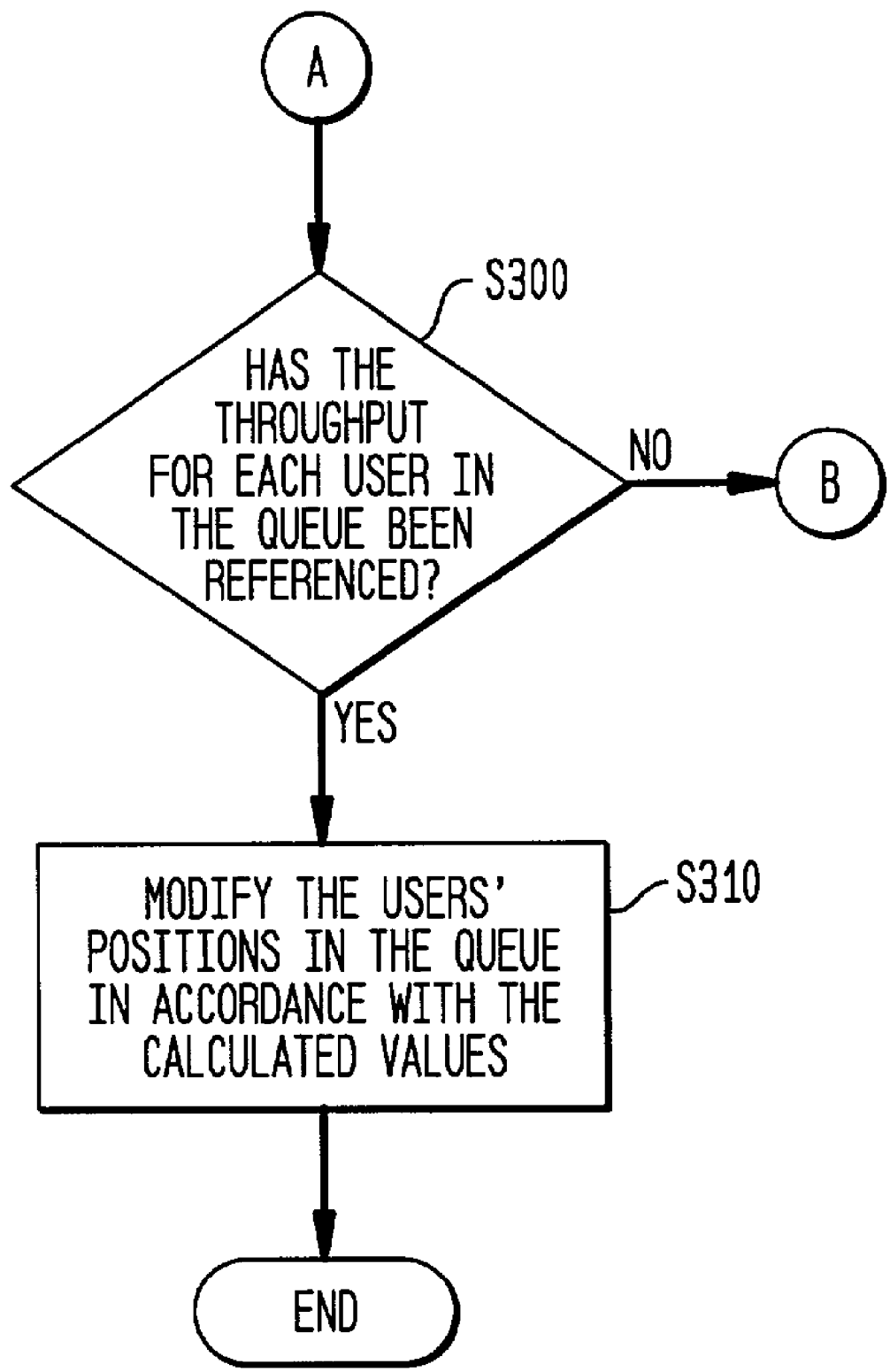
FIG. 3 illustrates a continuation of the flowchart of FIG. 2.

FIGS. 2 and 3 illustrate a GoS method according to an embodiment of the present invention. The GoS method can be embodied in software or hardware. Preferably, the method operates functionally within the BS 40. However, other elements of a communications network may also be used as operational requirements dictate.

The method illustrated in FIGS. 2 and 3 refers to a network queue. This network queue is located in the BS 40 and contains data to one or more MSs. Data is put in the BS 40 queue and assigned a priority level or queue index position in accordance with a scheduling process as processing requirements, such as an overload condition, dictate. Although the network queue is discussed as being located in the BS 40, as indicated, other elements of the communications network may also hold the queue. For example, a mobile station switching station center (MSC) and/or the RNC may also include the network queue.

Referring now to FIG. 2, foremost, a user's throughput level in the network is determined (S200). The throughput level is a value assigned to each user in network that is indicative of past data transmission rates in the network. Next, the determined throughput level is compared with an assigned Rmin value (S210). If the determined throughput level is less than the Rmin value (S220), then an urgency value for modifying the user's data position within the queue is calculated (S240). Alternatively, if the determined throughput level is not less than the Rmin value, the throughput level is compared with an assigned Rmax value (S250). If the throughput level is higher than the assigned Rmax value, then a super penalty value is calculated for modifying the user's data position in the queue (S260). On the other hand, if the determined throughput level is lower than the Rmax value, then a normal penalty value is calculated for modifying the user's data position in the queue (S270).

Referring now to the flowchart in FIG. 3, which is joined with the flowchart in FIG. 2, it is determined if there are additional users, having data in the queue, that need to have their throughput levels analyzed (S300). That is, each user data packet/stream in the queue should undergo the method illustrated in FIGS. 2 and 3. It there is data in the queue that has not been processed, data is identified and that user's throughput level associated with the identified data is determined (S200). The other processes in the method are accordingly followed as described heretofore. Alternatively, once each of the user's throughputs has been determined, the position of data within the queue associated with the users is modified in accordance with assigned urgency and penalty values (S310).

The method according to the present invention may be embodied in software, hardware, or a combination of both hardware and software. Moreover, the method of the present invention may be implemented in various elements of a communications network.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for queuing in a communications network, comprising:
    assigning a priority value to a user to maintain throughput of the user between a first reference value and a second reference value based on grade of service (GoS), the first and second reference values being throughput rates, the assigning including applying an urgency value to the priority value of the user if the throughput of the user is below the first reference value, and the assigning including applying a penalty value to the priority value of the user if the throughput of the user is above or equal to the first reference value; and
    positioning data related to the user within a queue based on the GoS assigned to the user and the assigned priority value, the urgency value placing the data of the user in a queue position at least above a previous queue position, and the penalty value placing the data of the user in a queue position at least below a previous queue position, a higher queue position being processed before a lower queue position.

2. The method according to claim 1, further comprising determining a throughput value of the user.

3. The method according to claim 2, wherein the first and second reference values are based on the GoS assigned to the user.

4. The method according to claim 1, wherein the assigning includes applying a super penalty value to the priority value of the user if the throughput of the user is above the second reference value, the super penalty value placing the data of the user at a queue position at least below a previous queue position.

5. The method according to claim 1, wherein the data is positioned in a network queue.

6. A computer-readable medium having at least one code segment recorded thereon that causes a processor to perform the method according to claim 1.

7. A communications network apparatus, comprising:
    a processor configured to assign a priority value to at least one user of a communications network to maintain throughput of the at least one user between a first reference value and a second reference value based on a grade of service (GoS) assigned to the at least one user, the first and second reference values being throughput rates, the processor being configured to apply an urgency value to the priority value if the throughput of the user is below the first reference value, and the processor being configured to apply a penalty value to the priority value if the throughput of the user is above or equal to the second reference value; and
    a queue having data therein associated with the at least one user, the data being positioned in the queue in accordance with the GoS and the priority value assigned to the at least one user, the urgency value placing the data of the user at an index position in the queue at least above a previous index position of the data, the penalty value placing the data of the user at an index position in the queue at least below a previous index position of the data, a higher index position being processed before a lower index position.

8. The apparatus according to claim 7, wherein the communications network apparatus is a base station controller of a wireless communications network.

9. The apparatus according to claim 7, wherein the first and second reference values are based on the GoS of the at least one user.

10. The apparatus according to claim 9, wherein the processor is configured to apply a super penalty value to the priority value if the throughput value of the at least one user is greater than the second reference value, the super penalty value placing the data of the user at an index position in the queue farther from an output of the queue with respect to a previous index position of the data.

11. The apparatus according to claim 9, wherein the first and second reference values are determined based on a throughput target value associated with the at least one user.

* * * * *